Patented Mar. 11, 1930

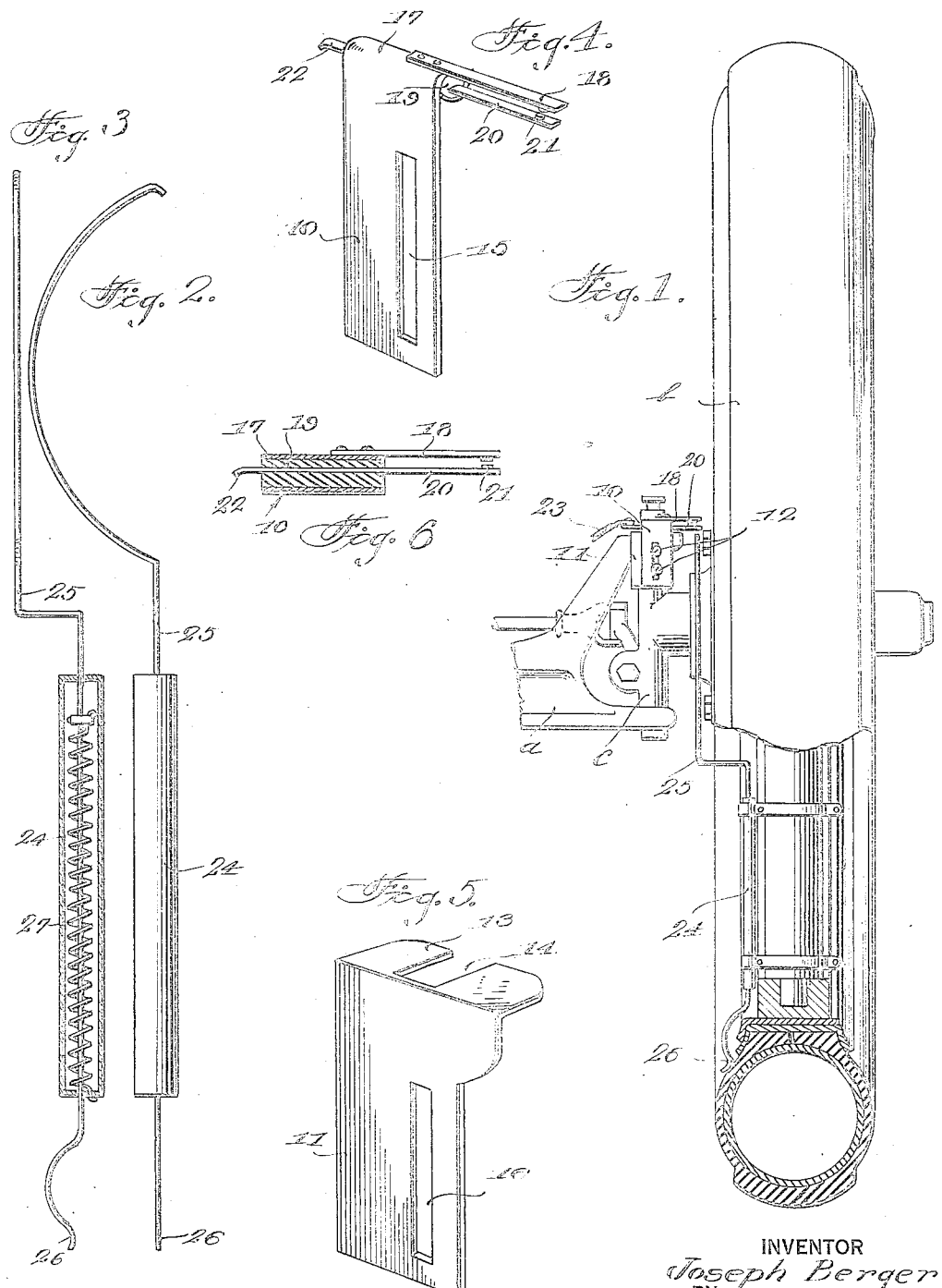

1,750,563

UNITED STATES PATENT OFFICE

JOSEPH BERGER, OF CARSON CITY, NEVADA

TIRE-DEFLATION SWITCH

Application filed January 24, 1927. Serial No. 163,173.

This invention relates to improvements in tire signals generally, and more particularly to a type of the same adapted to give warning to the operator of an automobile of the deflation of one or more of the tires of the automobile during its travels.

The principal object of the invention is to provide for a signal of the class set forth, and one which will be electrically connected in circuit with the usual ignition or lighting circuits of an automobile, and automatically set in operation upon the deflation, or partial deflation, of a tire, and intermittently thereafter with each continued rotation of a wheel on which the deflation of the tire has occurred, and until the automobile is brought to a full stop.

A further object of the invention is to provide for an alarm of the character mentioned, and one of a comparatively simple and inexpensive construction, but highly efficient construction and arrangement of parts, such as will be readily adapted for use and quick installation on automobile wheels of various kinds or makes.

With the foregoing and other equally important objects and advantages in view, the invention resides in the certain new and useful combination, construction and arrangement of parts as will be hereinafter more fully described, set forth in the appended claims, and illustrated in the accompanying drawing, in which:

Figure 1 is a fragmentary front elevation of one of the wheeled ends of an axle of an automobile, the wheel being partly in section, and showing a practical application of the preferred embodiment of the invention thereto.

Figure 2 is a side elevation of the signal actuating means per se,

Figure 3 is a front elevation of the signal actuating means with the casing of the spring associated therewith shown in section, Figures 4 and 5 are perspective views of the cooperative parts to be secured to the axle yoke of the wheel spindle for supporting the signal control switching means in position for operation by the actuating means aforesaid, Figure 6 is a vertical section through the upper cylindrical portion of the electrical contact part as shown in Figure 4.

Referring to the drawings, wherein similar characters of reference designate corresponding parts throughout the several views thereof, the embodiment of the invention as shown therein comprises an electric switching device formed of a pair of metal plates or members 10 and 11, which are clamped in associated relation by means of bolts or the like 12, at one side of the axle $a$ immediately adjacent the inner side of the wheel $b$ of an automobile or the like. These members or plates 10 and 11 will vary in shape depending upon application to the front or rear axle of an automobile, and in their attachment to the front axle $a$ as shown, they will preferably be secured in position at the upper end of the yoke or fork in which the spindle $c$ of one of the front steering wheels is journaled in the usual manner on substantially all makes of automobiles. When positioned on a front axle, as suggested, the member or plate 10 will have its upper end angularly bent, as at 13, and this bent portion will have a slot 14 opening outwardly of its free end edge, which will be engaged with a suitable fastening at the upper side of the axle yoke, such as the head portion of the steering spindle $c$. To allow for desired vertical or angular adjustments of the members or plates 10 and 11, both of the same will have alined vertically extending slots 15 and 16 respectively, through which the clamping bolts 12 are engaged.

The outer plate 10 is shaped to provide a substantially cylindrical portion 17 from the upper side of the forward or outer end of which is an extension or tongue 18 forming one of the circuit making and breaking contacts of the switching device, the same being grounded to the frame of the automobile through the clamp bolts, 12, the member or plate 11, the yoke of the axle $a$, and the other usually associated parts of the automobile. Fitted into the bore of the cylindrical portions 17 of the plate 10 is a filler 19 of an insulating material such as wood, fiber or the like, through which a resilient metal contact member or strip 20 is extended. The opposite ends of the member or strip 20 are projected beyond the opposite ends of the filler 19, which preferably terminates flush in the plane of the opposite ends of the cylindrical portions 17. The forward projected end of the contact member or strip 20 is co-extensive with the contact member or tongue 18, and is preferably formed to provide an upwardly directed depressed portion to form a contact nib 21 to be moved into contact with the latter when the member or strip 20 is flexed in an upward direction for the purpose. The opposite or rear end of this contact strip or member 20 is provided with a depending portion 22 from which a conductor 23 is led to one terminal of a signal device (not shown), such as an electric bell or the like, mounted on the forward part of the automobile, preferably on the dash or instrument board thereof. The opposite terminal of the signal device 24 is connected to one terminal of the source of current supply or battery (not shown) of the usual ignition or lighting circuits of an automobile, while the other terminal of the current source is grounded to the frame of the latter. Secured radially of the inner side of the wheel $b$ of the automobile is a tubular member or casing 24, through which is passed a switch actuating member 25, which is preferably formed of a suitable length of metal rod or stiff wire. This member 25 has its upwardly directed end portion bent in a manner to clear the hub portion of the wheel and the spindle thereof, and its extreme upper end is disposed directly beneath or attached to the under side of the resilient contact member or strip 20, while the lower end portion is projected downwardly through the casing 24 to a point immediately adjacent the inner periphery of the pneumatic tire with which the wheel is equipped. The extreme lower end of the member 25 is preferably bent to provide a portion 26 which lies close to the adjacent wall portion of the tire. This bent portion 26 is preferably curved in a manner to clear the adjacent rim portion of the tire with which it is associated, so that when the tire becomes deflated, the upward buckling of the tractive portion of the tire will be effective on the adjacent end of the member 25 to force the same upwardly.

Mounted within the casing 24 is a coil spring 27, which has its lower end fastened to the complemental end of the casing, while its upper end is attached to the member 25. The spring is so arranged that it normally exerts a downward pull on the member 25, so as to assure that the lower portion 26 thereof will be disposed in proper close proximity to the inner wall portion of the tire with which it is associated.

In the operation of the device, in the event of a tire becoming deflated, when that portion of the tire with which the bent portion 26 of the member 25 is cooperatively arranged is depressed between the ground and its supporting frame, the upward buckling of the inner side of the tire wall will exert an upward pressure on the member 25, which transmits such pressure to the spring member 27. Under the action of this upward pressure, the resilient contact 20 is forced upwardly and makes contact through the nib portion 21 with the contact member 18, when the circuit will be completed through the signal device, and the source of current supply of the automobile. The continued rotation of the wheel on which the tire has become deflated will cause the signal device to be intermittently sounded until the automobile is brought to a stop.

Without further description, it is thought that the features and advantages of the invention will be readily apparent to those skilled in the art, and it will, of course, be understood that changes in the form, proportion and minor details of construction may be resorted to, without departing from the spirit of the invention or its scope as claimed.

Having thus fully described the invention, what is claimed is:

1. A circuit closure comprising a two-part clamp to be attached to a part of the running gear of a motor vehicle, a hollow cylindrical portion formed at one end of one part of said clamp, a contact extension formed at one end of said cylindrical portion, a resilient contact member supported within the said cylindrical portion and insulated therefrom and having a portion cooperative with the said contact extension, and means for flexing said resilient contact member to make and break the circuit between the same and said contact extension.

2. In a device of the class described, a circuit closer comprising a two-part clamp to be attached to a part of the running gear of a motor vehicle, a hollow cylindrical portion formed at one end of one part of said clamp, a contact extension formed at one end of said cylindrical portion, an insulating filler disposed in the bore of said cylindrical portion, a resilient contact strip extending through said filler in parallel to said first named contact, and means for flexing said resilient contact member to make and break the circuit between the same and said first-named contact.

3. In a device of the class described a circuit closer comprising a two-part clamp to be attached to a part of the running gear of a motor vehicle, a hollow cylindrical portion formed at one end of one part of said clamp, a contact extension formed at one end of said cylindrical portion, an insulating filler said cylindrical portion, disposed in the bore of said cylindrical portion, a resilient contact strip extending through said filler in parallel to said first named contact, and automatic means for flexing said resilient contact member to make and break the circuit between the same and said first-named contact.

4. In a device of the class described, a circuit closer comprising a two-part clamp to be attached to a part of the running gear of a motor vehicle, a hollow cylindrical portion formed at one end of one part of said clamp, a contact extension formed at one end of said cylindrical portion, an insulating filler disposed in the bore of said cylindrical portion, a resilient contact strip extending through said filler in parallel to said first named contact, and means operable by the buckling movement of a deflated tire on the vehicle for intermittently flexing the resilient contact to make and break contact between the same and said first-named contact.

Dated at Carson City, Nevada, this 19th day of January, 1927.

JOSEPH BERGER.